United States Patent

Reid

[15] 3,694,578

[45] Sept. 26, 1972

[54] GROUP COMMUNICATION APPARATUS

[72] Inventor: Alexander Arthur Luttrell Reid, London, S.W. 15, England

[22] Filed: Jan. 20, 1971

[21] Appl. No.: 107,888

[30] Foreign Application Priority Data

Jan. 26, 1970 Great Britain............3,666/70

[52] U.S. Cl. ............................179/1 CN, 179/18 BC

[51] Int. Cl. ..............................................H04m 3/56

[58] Field of Search..179/1 CN, 18 BC, 37, 1 B, 1 H, 179/1 VC

[56] References Cited

UNITED STATES PATENTS

| | | | |
|---|---|---|---|
| 3,363,061 | 1/1968 | Gardner | 179/1 CN |
| 3,423,532 | 1/1969 | Coel et al. | 179/1 CN |
| 3,601,530 | 8/1971 | Edson et al | 179/1 CN |
| 3,126,448 | 3/1964 | Millett | 179/1 H |

*Primary Examiner*—Kathleen H. Claffy
*Assistant Examiner*—Horst F. Brauner
*Attorney*—Linton & Linton

[57] ABSTRACT

First and second conference tables are provided at separated locations. Each table carried a plurality of outward facing microphones alternating peripherally of the table with a plurality of inward facing loudspeakers. Participants sit only in front of the microphones and each participant is represented at the remote table by the correspondingly situated loudspeaker. A transmitter control means at each table senses a selected microphone in use and passes a control signal characteristic of that microphone over a communications link. A receiver control means at each table selects, upon receipt of the control signal, the appropriate loudspeaker corresponding to the selected microphone and feeds to that loudspeaker an audio signal from the selected microphone over a telecommunications link. A microphone may be selected on the basis of a push button switch or on the basis of audio signal level or both. Visual indicators at each microphone and loudspeaker indicate when they are in use.

11 Claims, 5 Drawing Figures

INVENTOR
ALEXANDER ARTHUR LUTTRELL REID
BY
Linton and Linton
ATTORNEYS

INVENTOR
ALEXANDER ARTHUR LUTTRELL REID
BY
Linton and Linton
ATTORNEYS

INVENTOR
ALEXANDER ARTHUR LUTTRELL REID

BY

Linton and Linton

ATTORNEYS

INVENTOR
ALEXANDER ARTHUR LUTTRELL REID
BY
Linton and Linton
ATTORNEYS

GROUP COMMUNICATION APPARATUS

The present invention relates to apparatus allowing groups of persons to communicate between separated locations.

It is known to provide means allowing two groups of persons in two separated locations to communicate by a telephonic link having a separate hand set for each participant or a microphone and loudspeaker in each location. This is unattractive in practice and the reason is now identified as being due to the difficulty of determining, at the receiving location, which of the persons at the other location is speaking. These have also been proposed full television systems whereby each group of persons can see and hear the other group during conversation. Such systems clearly approach the ideal of an actual personal meeting but are prohibitively expensive for practical use.

It is an object of the present invention to provide a relatively inexpensive group communication apparatus which provides better participant identification than the above simple audio systems.

According to the present invention there is provided apparatus for group communication between at least two separated locations comprising a first array of microphones positioned for use by a first group of persons, a first array of loudspeakers positioned in the vicinity of the first array of microphones, a second array of microphones positioned for similar use by a second group of persons remote from the first group, a second array of loudspeakers in the vicinity of the second array of microphones, transmitter control means at each location for producing a control signal indicative of a microphone which has been selected for use, each transmitter control means being adapted to pass said control signals and audio signals from said microphones along a telecommunications link to the remote location, and receiver control means at each location adapted to select, upon receipt of a control signal, a loudspeaker corresponding to a selected microphone of the remote array, and to feed to that loudspeaker an electrical audio-signal from at least that selected microphone.

According to the present invention in another aspect there is provided a table having a plurality of microphones mounted thereon at spaced intervals adjacent the periphery of the table, said microphones being directional in a general outward sense from the center of the table, and a plurality of loudspeakers interspersed between said microphones, said loudspeakers being directional in a general inward sense with respect to the table center, transmitter control means associated with the table for producing a control signal indicative of a microphone which has been selected for use, said transmitter control means being adapted to pass said control signals and audio signals from said microphones to a telecommunications link, and receiver control means associated with the table and adapted to select, upon receipt of such a control signal a loudspeaker appropriate to that control signal and to feed to that loudspeaker an incoming electrical audio signal, whereby said table may be used in cooperation with a similar table at a remote location to permit group communication between separated locations.

An embodiment of the invention will now be described, by way of example only, with reference to the accompanying drawings, in which.

Figure 1:
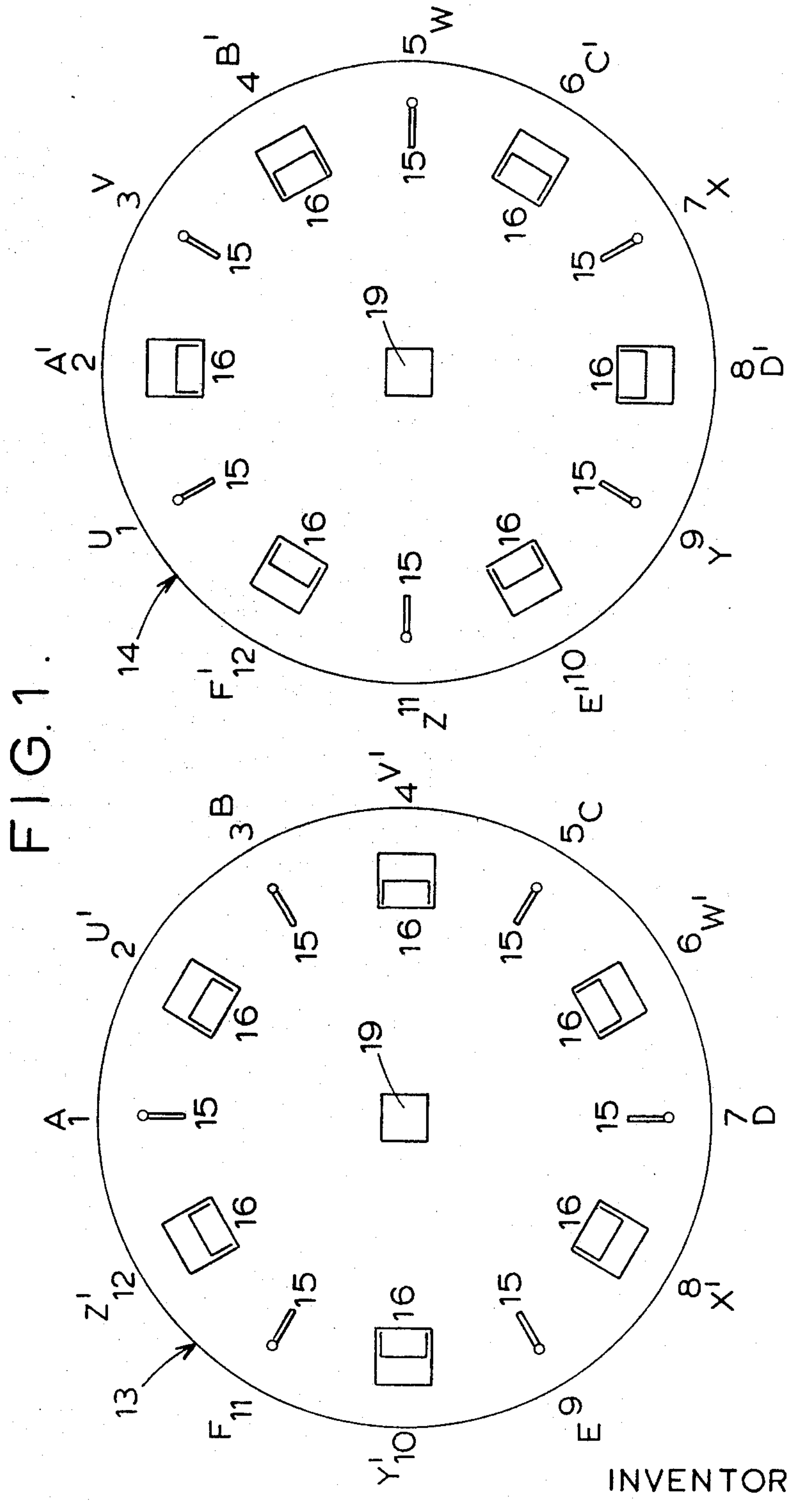
FIG. 1 is a plan view in diagrammatic form of a pair of conference tables arranged for use in connection with the present invention.

Referring to FIG. 1, two circular conference tables 13 and 14 are situated at separated locations and linked by a telecommunications channel such as three telephone links. Around each table are positioned 12 seating places, each including either a microphone unit 15 or a loudspeaker unit 16. The microphone units and loudspeaker units alternate around the tables, and the arrangements of the two tables are such that each position occupied by a microphone unit at one table is occupied by a loudspeaker unit on the other.

In practice each table is occupied by up to six persons indicated in FIG. 1 by the letters A to F and U to Z. The persons A to F occupy those seats around the table 13 which face microphone units 15 and the persons U to Z occupy those seats around the table 14 which face microphone units. Those positions on each table from which loudspeakers face towards the rest of the table correspond to a person at the other table addressing a microphone. Thus each table has up to six persons present, facing microphone units, and up to six persons absent, represented by loudspeaker units. The absent persons at table 13 are represented by letters U′ to Z′ and those at table 14 by letters A′ to F′.

Each microphone unit 15 comprises a microphone, a name plate, a visual indicator such as an electric lamp, and a push button. Each loudspeaker unit 16 comprises a loudspeaker, a name plate, and a visual indicator such as an electric lamp. These units are more fully described below in relation to FIGS. 4 and 5.

The overall system of operation is such that at each location a transmitter control means and a receiver control means (to be described hereinafter with reference to FIGS. 2 and 3) pass electrical audio-signals from the microphones to a telephone link and from a telephone link to the loudspeakers, respectively, in such a manner that when a person absent from a table speaks, his voice is produced at the remote loudspeaker corresponding to his position at the table at which he is present. At the same time the visual indicators at both his real, present, position and his corresponding absent position are illuminated. It has been found that the positive association, in this manner, of the voices of the absent persons each with a particular plate at a table enables a discussion or conference between two separated groups of persons readily to proceed, each participant being able very rapidly to identify each speaker.

In addition to the lettering A to F and U to Z, the seat plates at tables 13 and 14 are numbered 1 to 12, such that odd numbers correspond to microphone units (microphone unit 1 etc.) and even numbers correspond to loudspeaker units (loudspeaker unit 2 etc.). A seventh loudspeaker 19 is fitted centrally in each table; its purpose is described below with reference to FIG. 3.

Figure 2:
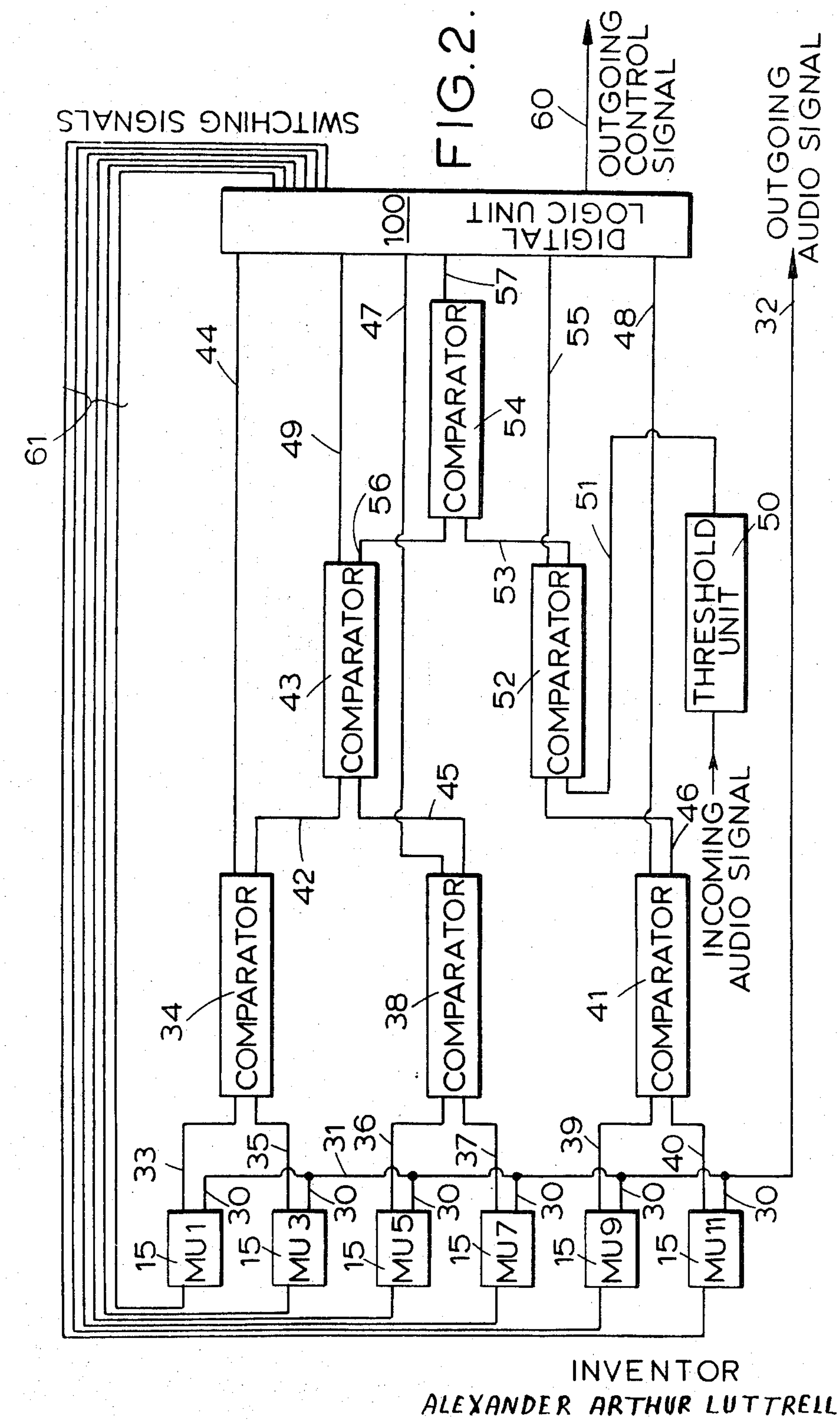
FIG. 2 is a block circuit diagram of a transmitter control means for use with each table.

Referring now to FIG. 2 there is shown a transmitter control means as associated with each table 13 and 14. This is operative to compare the signals from the individual microphones on the associated table in a hierarchy of comparators until it is found which microphone is providing the greatest signal. A digital logic unit then generates and transmits over a control link the signal characteristic of the selected microphone. A certain degree of electrical inertia is present in the comparator hierarchy so that once a particular microphone has been selected it is not immediately usurped by relatively short sharp sounds or noises (e.g. striking a match) at other microphones on that table.

Figure 4:
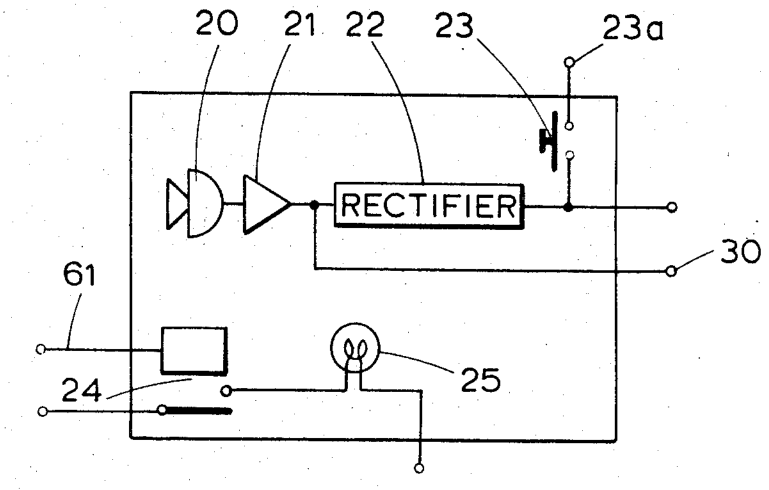
FIG. 4 is a schematic diagram of a microphone unit.

Turning now to FIG. 2 in more detail six identical microphone units are shown, and one of these is illustrated more fully in FIG. 4. Each unit 15 comprises a microphone 20, a pre-amplifier 21, a rectifier 22, a push button switch 23, a relay controlled switch 24, and a lamp 25. The electrical signal generated by sound impinging on microphone 20 is pre-amplified by pre-amplifier 21 and part of the resulting signal is passed by line 30 and a common line 31 to the outgoing audio communication channel 32. The other part of the pre-amplified signal in microphone unit 1 is rectified by rectifier 22 and passed by line 33 to a first comparator 34. Microphone unit 3 is similarly arranged to pass a rectified audio signal by line 35 to the second input of the first comparator 34. Similarly microphone units 5 and 7 pass a rectified audio signal by lines 36 and 37 to the 2 inputs of a second comparator 38, and units 9 and 11 pass signals by lines 39 and 40 to a third comparator 41.

At the first comparator 34 the two incoming signals are compared. The greater signal is passed on by line 42 to a fourth comparator 43 and at the same time comparator 34 generates and passes by line 44 a control signal indicating its state to a digital logic unit 100. Similarly the second and third comparators 38 and 41 pass the greater signal by lines 45 and 46, and pass control signals by lines 47 and 48 to unit 100.

A threshold unit 50 is provided and is adapted to pass on line 51 either a rectified incoming audio signal (as received by the associated receiver control means of FIG. 3) or a fixed threshold signal, which ever is the greater of the two. A fifth comparator 52 compares this signal from the threshold unit with the output 46 of the third comparator 41 and passes the greater signal on line 53 to a final comparator 54, at the same time sending a control signal by line 55 to unit 100. Comparator 54 compares the signal on line 53 with the signal on line 56 from the fourth comparator and simply passes a control signal by line 57 to unit 100 to indicate which is the greater. Digital logic unit thus receives control signal from each comparator indicating their respective states.

When the comparators are in such a combination of states as to indicate to the logic unit 100 that microphone unit 1, for example, is generating the greatest signal, and that this signal is greater than the signal passed by threshold unit 50, a control signal consisting of a frequency or combination of frequencies peculiar to microphone unit 1 is generated by the digital logic unit and passed to a telephone link 60. A switching signal is generated at the same time by unit 100 and passed along the appropriate one of the six switching lines 61 to operate the relay to cause the electric lamp 25 at the selected microphone unit 1 to illuminate, whereby to indicate visually to the persons at that table which microphone, if any, has at any one time been selected. It will be appreciated that the operation is similar for the remaining microphone units 3 to 11, the digital logic unit 100 generating an individual control signal for each microphone unit. The precise electrical form of the control signals is unimportant provided there is a different signal associated with each microphone unit.

When no microphone signal exceeds the signal passed by the threshold unit 50, a control signal peculiar to this null condition is generated by the digital logic unit 100.

It will be recalled that a push button switch 23 is associated with each microphone unit. Depression of such a push button switch will have no effect unless the system is in the above described null condition. In the null condition, pressing the push button on for example microphone unit 1 will transmit a sufficiently large d.c. signal, from a suitable source connected to terminal 23*a*, to the first comparator 34 to indicate to the digital logic unit 100 that microphone unit 1 is receiving the largest audio signal. This facility may be used either as a device for the manual (as opposed to vocal) selection of microphone 1, or to indicate to the other table that the participant at microphone 1 wishes to intervene in the discussion. The push buttons at the other microphone units operate similarly.

Figure 3:
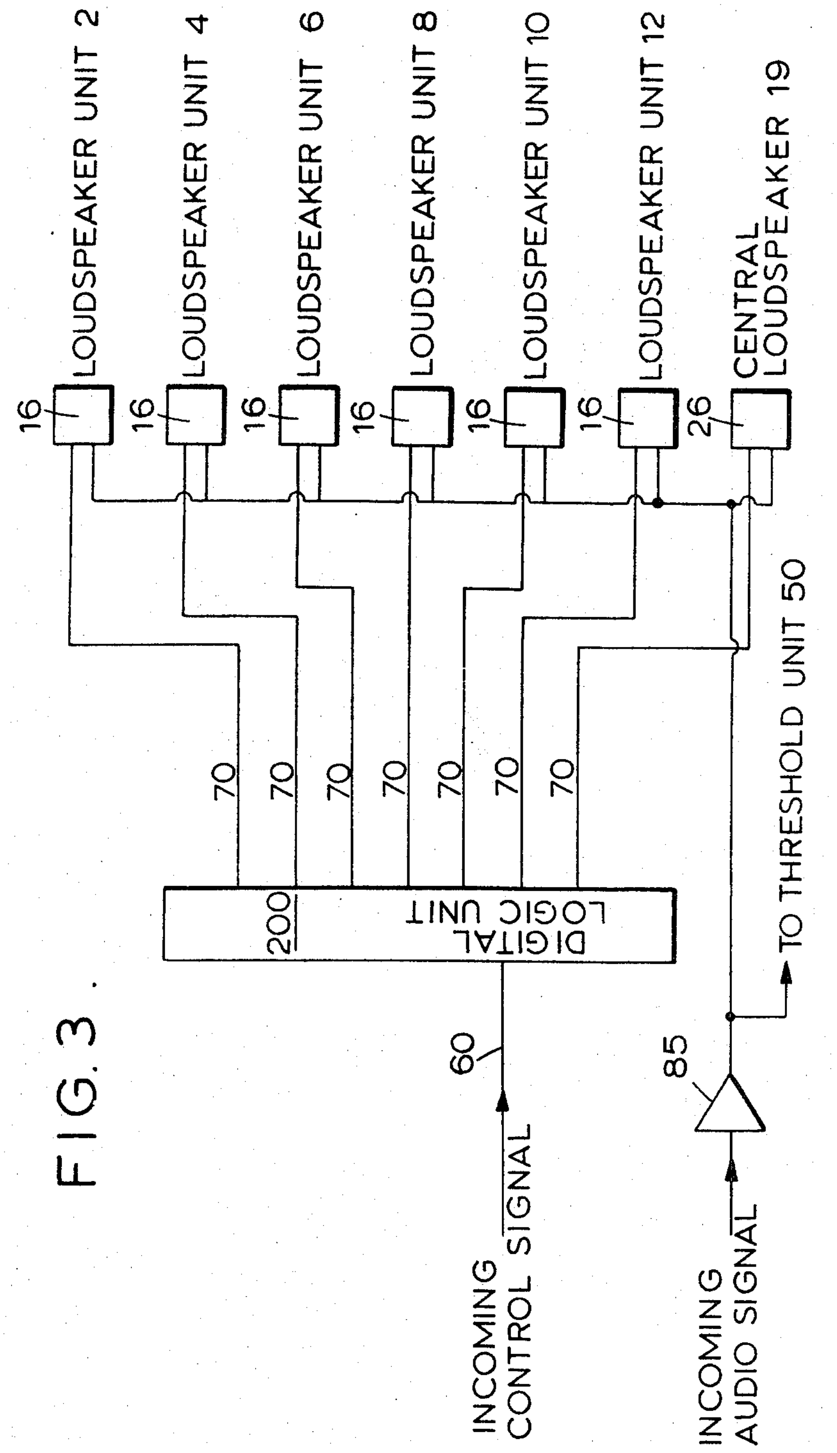
FIG. 3 is a block circuit diagram of a receiver control means for use with each table.
Figure 5:
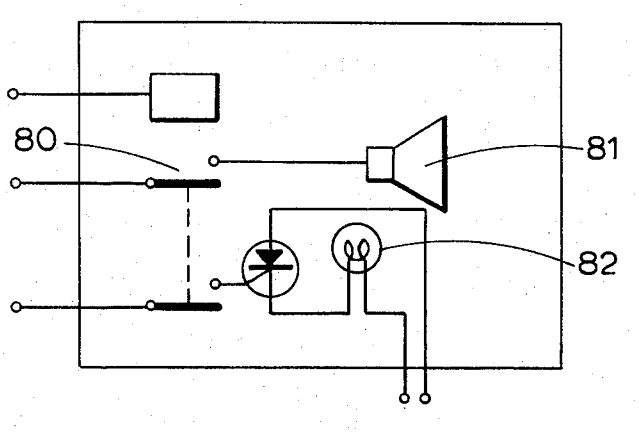
FIG. 5 is a schematic diagram of a loudspeaker unit.

Referring now to FIG. 3 there is indicated a receiver control means, each loudspeaker unit therein being identical and as shown in FIG. 5. An imcoming control signal on line 60 is passed to the digital logic unit 200, which passes a switching signal on the appropriate one of line 70 to the appropriate loudspeaker unit. This switching signal operates a two channel relay 80 in the appropriate unit to cause that loudspeaker 81 to be connected to the amplified incoming audio signal, and also to cause the electric lamp 82 in that unit to be illuminated by connecting it to a suitable voltage source (not shown). The incoming audio signal is amplified in amplifier 85. In the case of the null condition the central loudspeaker 19 only is connected to the amplified incoming audio signal. In either case a part of the amplified incoming audio signal is passed to the threshold unit 50 in the transmitter control means described with reference to FIG. 2.

It will be seen that when the persons at one table are largely silent the state of the comparators in the transmitter control means indicate a null condition and causes the digital logic unit 100 to pass an appropriate control signal along link 60 to the digital logic unit 200 in the receiver control means of the other table. Any signals from the microphones then go to the central loudspeaker 19. When a person at the one table wishes to speak he either depresses his push button switch 23 or simply starts speaking. In either case the comparators sense this, the unit 100 passes a control signal to unit 200, and unit 200 switches off the central loudspeaker 19 and switches on the appropriate individual loudspeaker unit 16.

In the arrangement described three telephone links are employed and two of these are preferably hi-fidelity links. One link is used to carry the audio signal in one direction, the second link to carry the audio signal in the other direction, and the third link to carry the control signals in both directions. Advantageously the number of telephone links may be reduced by mixing the signals through an appropriate system of filters, as will be appreciated by those skilled in the art. In particular, for example, the control signals may readily be coded into the audio signal channel without significant loss of fidelity, since the information content of the control signals is relatively very low.

A number of locations connected by the apparatus embodying the invention may be greater than 2. For example three tables may be used together with transmitter and receiver control means similar to those illustrated to inter-connect two locations having three persons present, and one location having six persons present.

In the described embodiment of the transmitter control means all six microphones 20 have been shown and described as being connected all the time to the outgoing audio signal line 32. A slight disadvantage of this is that when the person at one particular microphone is speaking, his voice appears at the appropriate loudspeaker together with any background noise picked up by the other five microphones. An advantage however is that this allows speedy interruption at a fast moving discussion. Where the communication link between two tables is of low quality, or for other reasons, it may be desirable to arrange for only one microphone at a time to be connected to the outgoing audio line 32. This can readily be accomplished by using the switching signal on the appropriate line 61 both to connect the microphone 20 to line 30 as well as to illuminate the lamp 25 as described, a two channel relay being used similar to relay 80 in the loudspeaker unit. The Chairman of a meeting may in the same manner be given a master over-ride switch so that he alone can command the line 32.

It is desirable to avoid a situation wherein a loud voice from a loudspeaker is sufficient to trigger the physically adjacent microphones so that they in turn connect back to the loudspeakers physically adjacent to the person speaking with the loud voice. This would be a feedback situation and could cause undesirable howling on the line. It may readily be avoided by using directional, as opposed to omni-directional, microphones and loudspeakers. The microphones are arranged and disposed to be directional in a generally radially outward direction and the loudspeakers are directional in a generally radially inward direction with respect to the pertinent table center. Moreover the loudspeakers preferably have their effective audio out put points nearer the table center than the effective audio input points of the microphones. It will also be seen that circular or oval tables are to be preferred for this reason to rectangular tables.

The microphone and loudspeaker units have been described and shown in FIGS. 4 and 5 for convenience as incorporating all the elements individual to each microphone or loudspeaker. In practice it may be found more convenient to mount simply the microphones, lamps and loudspeakers on the tables, and to house the various relay control switches, preamplifiers and rectifiers in a central control unit for each table together with the transmitter and receiver control means.

In the described embodiment the threshold signal from the threshold unit 50 is compared in the hierarchy of comparators on the same basis as each microphone signal. In an alternative arrangement a slight delay (for example 2 seconds) is introduced to signals passing from the unit 50 to the pertinent comparator, which in this case in conveniently arranged to be the topmost in the hierarchy. The unit 100 would not then generate the null condition signal until a delay of 2 seconds had elapsed since the last above-threshold signal from a microphone. This would permit a person to pause during an utterance for short periods without losing the outgoing line to his individual loudspeaker at the remote location.

I claim:

1. Apparatus for group communication between at least two separated locations comprising a first array of microphones positioned for use by a first group of persons, a first array of loudspeakers positioned in the vicinity of the first array of microphones, a second array of microphones positioned for similar use by a second group of persons remote from the first group, a second array of loudspeakers in the vicinity of the second array of microphones, transmitter control means at each location for producing a switching control signal uniquely indicative of a particular microphone which has been selected for use, each transmitter control means being adapted to pass said switching control signals and audio signals from said microphones along a telecommunications link to the remote location, and receiver control means at each location adapted to respond to receipt of a switching control signal to close a circuit path to that particular loudspeaker which correspond to a selected microphone of the remote array, and to feed to that loudspeaker through said closed circuit path an electrical audio-signal from at least that selected microphone over said telecommunications link.

2. Apparatus according to claim 1 wherein the physical positions of the microphones and loudspeakers alternate with each other at each location.

3. Apparatus according to claim 2 wherein the microphone and loudspeaker arrays at each location are physically arranged so that each loudspeaker in one location is in a position corresponding to that microphone in another location from which may be received the electrical audio signal to be reproduced by that loudspeaker.

4. Apparatus according to claim 1 including a visual indicator associated with and disposed adjacent each said loudspeaker, the pertinent receiver control means being arranged to energize the indicator associated with any loudspeaker to which an audio signal is being fed while that loudspeaker is being so fed.

5. Apparatus according to claim 1 wherein each transmitter control means includes means for detecting which microphone of the pertinent array generates the greatest signal, the transmitter control means generating a control signal indicative of that microphone which at any one time has been so detected as generating the greatest signal.

6. Apparatus according to claim 5 wherein each transmitter control means includes means for generating a threshold signal, means for comparing the threshold signal with the microphone signals to detect whether any microphone signal is greater than the threshold signal, and means for generating and transmitting a null condition indicating signal in the event no microphone signal is greater than said threshold signal.

7. Apparatus according to claim 6 wherein said threshold signal generating means provides a threshold signal which at any one instant is the greater of two signals comprising firstly a fixed level signal and secondly an incoming audio signal from a telecommunications link to a remote such array of microphones.

8. Apparatus according to claim 6 wherein an auxiliary loudspeaker is provided associated with each loudspeaker array, and wherein the microphones in one array are connected to the auxiliary loudspeaker in a remote array in the event of a null condition at the one location.

9. Apparatus according to claim 5 including a visual indicator associated with and disposed adjacent each said microphone, the pertinent transmitter control means being arranged to energize the indicator associated with any selected microphone while that microphone is in a selected condition.

10. Apparatus according to claim 1 including switch means associated with each microphone for causing selection of that microphone by the pertinent transmitter control means.

11. A table having a plurality of microphones mounted thereon at spaced intervals adjacent the periphery of the table, said microphones being directional in a generally outward sense from the center of the table, and a plurality of loudspeakers interspersed between said microphones, said loudspeakers being directional in a general inward sense with respect to the table center, transmitter control means associated with the table for producing a control signal indicative of a microphone which has been selected for use, said transmitter control means being adapted to pass said control signals and audio signals from said microphones to a telecommunications link, and receiver control means associated with the table and adapted to select, upon receipt of such a control signal a loudspeaker appropriate to that control signal and to feed to that loudspeaker an incoming electrical audio signal, whereby said table may be used in cooperation with a similar table at a remote location to permit group communication between separated location.

* * * * *